United States Patent
Kuo

(10) Patent No.: US 7,582,987 B2
(45) Date of Patent: Sep. 1, 2009

(54) DOUBLE POWER SOURCES SWITCHING CIRCUIT

(75) Inventor: Yu-Sheng Kuo, Taipei Hsien (TW)

(73) Assignee: Kinpo Electronics, Inc., Shenkeng Shiang (TW)

( * ) Notice: Subject to any disclaimer, the term of this patent is extended or adjusted under 35 U.S.C. 154(b) by 284 days.

(21) Appl. No.: 11/711,134

(22) Filed: Feb. 27, 2007

(65) Prior Publication Data

US 2008/0203818 A1 Aug. 28, 2008

(51) Int. Cl.
*H02J 7/00* (2006.01)

(52) U.S. Cl. .......................................................... 307/66

(58) Field of Classification Search .................... 307/66
See application file for complete search history.

*Primary Examiner*—Robert L. Deberadinis

(57) ABSTRACT

A double power sources switching circuit comprises a detection unit utilizing a detection chip to detect a voltage state of a first power input terminal to provide a stable and accurate voltage level and output a corresponding signal; a power source switching circuit respectively electronically connected to a power output terminal, a second power input terminal and the detection unit and adapted to output a signal depending on the detection unit to determine whether to switch the second power input terminal to be electrically connected and transmit power to an electronic product using double power sources, therefore, the electronic product can be prevent from being reset or locked in the process of power source switching and the stability of a double power sources switching system can be elevated.

12 Claims, 2 Drawing Sheets

DOUBLE POWER SOURCES SWITCHING CIRCUIT

BACKGROUND OF THE INVENTION

1. Field of the Invention

The present invention relates to a double power sources switching circuit, and more particularly to a double power sources switching circuit of a product with a USB device capable of being connected to a USB port of a personal computer.

2. Description of Related Art

A general product with a USB device can be connected to a personal computer through a USB port of the personal computer. For example, a power source switching system and method of an external connection CD-ROM drive disclosed in Taiwan Patent Publish No. 200609743 applies hardware and firmware technologies to allow the external connection CD_ROM drive to receive not only domestic power source but also power source provided by a computer mainframe through an USB.

USB ports of current notebook computer and a several desktop personal computer cannot obtain power supply when they are in a power-down or sleep state, a product with double power sources USB device will switch the USB port to an internal power source to provide power source needed for it at this moment. But, because the discharge time of the USB port of the computer is too long in this process, it will lead to a situation that an uncertain section appears in the period of power source switching to cause the product in use to be reset or locked to cause the user's data to be lost and inconvenience to the user.

SUMMARY OF THE INVENTION

For allowing a double power sources switching circuit of an electronic device to accurately and quickly switch a power source and preventing the electronic device from being reset or locked in the process of power source switching, the present invention is proposed.

The main object of the present invention is to provide a double power sources switching circuit, allowing an electronic product utilizing double power sources not to cause the electronic product in use to be reset or locked, a user's data to be lost and inconvenience of the user owing too long switching time in the process of power source switching.

Another object of the present invention is to provide a double power sources switching circuit, capable of elevating the stability of an electronic product utilizing double power sources when the power source is switched, and further elevating the quality of the electronic product and a user's satisfaction.

For attaining to the objects mentioned above, a double power source switching switch according to the present invention is positioned between a computer system and a peripheral device, it comprises:

a power output terminal, used for outputting power to an electronic product;

a first power input terminal, used for inputting power to the power output terminal;

a second power input terminal, used for inputting power to the power output terminal;

a detection unit, used for detecting whether a voltage of the first power input terminal is lower than a preset switching value to allow a transition to be output; and a power source switching circuit, switching the second power input terminal to be electrically connected to the power output terminal to transfer power to the electronic product according to an output of the detection unit;

wherein, if the voltage of the first power input terminal is lower than the switching value of the detection unit in a continuous discharge state after the computer system is in a sleep or power-down mode, the power source switching circuit then switches the second power input terminal to provide electricity to the electronic product. Whereby, the phenomena that the product is reset or locked in the process of power source switching can be avoided and the stability of a double source switching system can be elevated.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
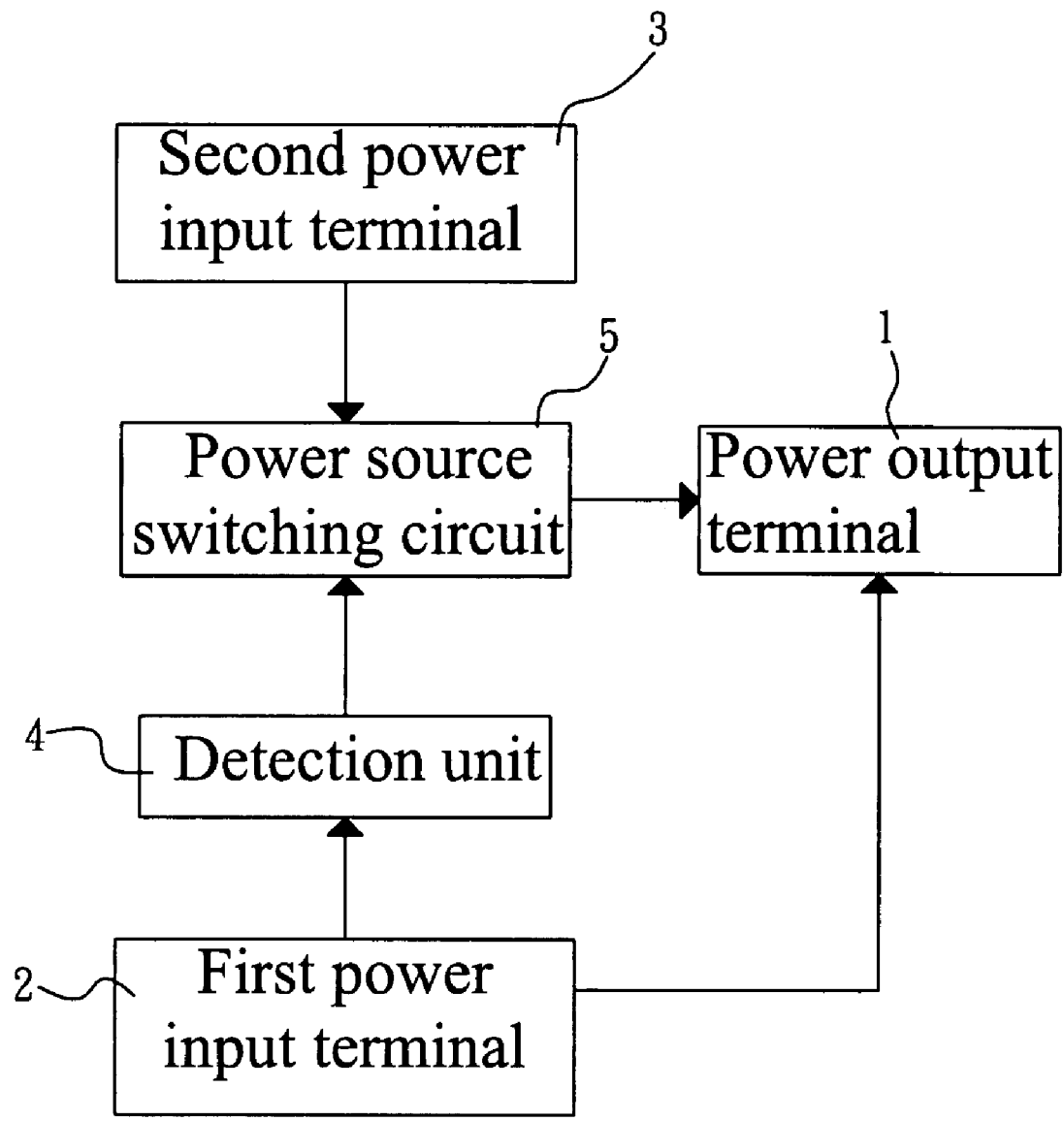
FIG. 1 is a block diagram, showing a double power sources switching circuit of a preferred embodiment according to the present invention.
Figure 2:
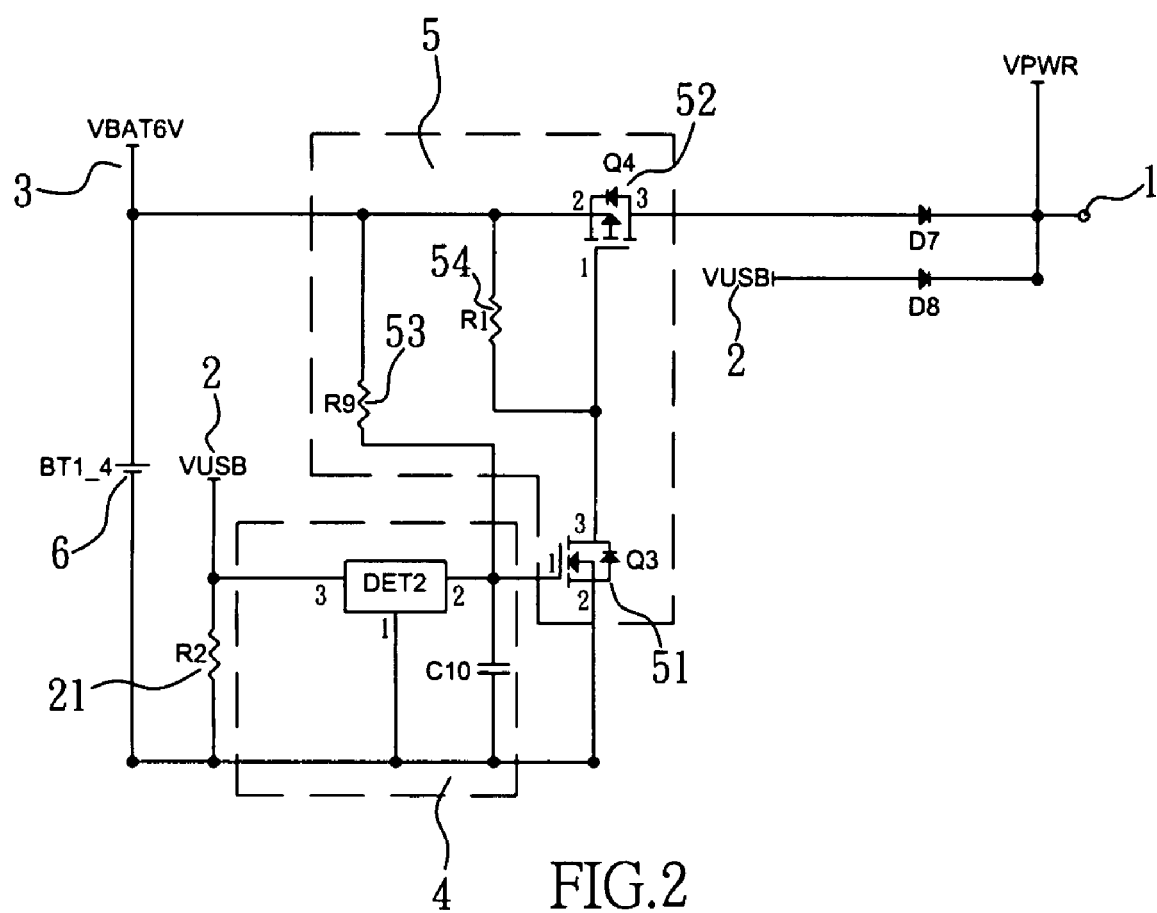
FIG. 2 is a schematic view, showing a structure of a double power sources switching circuit of a preferred embodiment according to the present invention.

Please refer to FIGS. 1 and 2. A double power sources switching circuit according to the present invention is adapted to elevate the stability of an electronic product with double power sources on power source switching. It comprises:

a power output terminal 1 used for outputting power to the electronic product;

a first power input terminal 2 respectively electrically connected to the power output terminal 1 and a grounding resistance 21 and capable of being a USB port of a personal computer;

a second power output terminal 3 electrically connected to a power source switching circuit 5, used for inputting power to the power output terminal 1 and capable of being electrically connected to a battery 6 from which power is provided to the electronic product;

a detection unit 4 detecting a voltage state of the first power input terminal 2, outputting a corresponding signal and comprising first, second and third terminals in which the first terminal is grounded, the second terminal is electrically connected to a power source switching circuit 5 and the third terminal is electrically connected to the first power input terminal 2 and grounded through the grounding resistance 21;

the power source switching circuit 5 respectively electrically connected to the power output terminal 1, the second power input terminal 3 and the detection unit 4, used for depending on an outputting signal of the detection unit 4 to determine whether to switch the second power input 3 to be electrically connected to the power output terminal 1 to transmit power to the electronic product 1 and comprising a first transistor 51 and a second transistor 52 in which the first transistor 51 and the second transistor 52 respectively have first, second and third terminals in which the first terminal of the first transistor 51 is electrically connected to the second terminal of the detection unit 4 and the second power input terminal 3 through a first resistance 53, the second thereof is grounded and the third terminal thereof is electrically connected to the second power input terminal 3 through a second resistance 54; the first terminal of the second transistor 52 is electrically connected to the third terminal of the first transistor 51 and then to the second power input terminal 3 through the second resistance 54, the second terminal thereof is electrically connected to the second input terminal 3 and the third terminal thereof is electrically connected to the power output terminal 1.

Please refer to FIG. 2. When a personal computer is in a turn-on state, the first power input terminal 2 transmits power to the power output terminal 1 to provide the power needed for the electronic product on one hand, and allows a potential of the third terminal of the detection unit 4 to be higher than a preset switching value on the other to enable the second terminal to be grounded and output a no-switching signal and further to cause the first terminal of the first transistor 51 to be at a low potential to lead to a situation that the second and the third terminals of the first transistors 51 is not communicated. In the meantime, the first terminal of the second transistor 52 is at a high potential to cause the second and third terminals of the second transistor 52 to be not communicated with each other to lead to a situation that power output from the battery 6 is unable to be transmitted to the power input terminal 1 via the second power input terminal 3 to provide power needed for the electronic product. Here, the preset value is a stable working voltage (approximately 3 to 4 volts) of the electronic product.

When the personal computer is in a power-down or sleep state, the voltage of the first power input terminal 2 will gradually drop and is unable to provide power for a normal operation of the electronic product, and cause the potential of the third terminal of the detection unit 4 to be lower than the switching value, the first and the second terminal s are then not communicated, and the second terminal is in a high potential state to output a transition because it is electrically connected to the second power input terminal 3 through the first resistance 53; this allows it to output a switching signal and further allows the first terminal of the first transistor 51 not to be grounded and to be in a high potential state. Furthermore, because the first terminal of the first transistor 51 is at a high potential, the second and the third terminals are allowed to communicate with each other to cause the third terminal thereof to be in a low potential state. In the meantime, because the first terminal of the second transistor 52 is grounded, the second and the third terminals are allowed to communicate with each other to enable power from the battery 6 to be transmitted to the electronic product to provide the power needed for the electronic product via the second input terminal 3, the second transistor 52 and the power output terminal 1.

Suppose that the potential of the first power input terminal 2 is allowed to be 5 volts when the personal computer is in a turn-on state and gradually drop to 0 volt when it is in a power-down or sleep state. The detection unit 4 selected in the present invention is particular, when the potential of the third terminal thereof is smaller than 4 volts, the second terminal thereof outputs a signal to the power source switching circuit 5 to cause the power source switching circuit 5 to communicate the second power input terminal 3 with the power output terminal 1 so as to transmit power to the electronic product. Therefore, this can provide an accurate, quick and stable power source switching timing of the power switching circuit 5 and does not behave like a general double power source switching circuit that needs to wait until the potential of the first power input terminal 2 drops to a potential lower than the working voltage of the system to process a power source switching operation in which a longer uncertain section will appear to cause the electronic product in use to be reset or locked to cause a user's data to be lost and the inconvenience on use to the user.

The detection function of the detection unit utilized in the present invention allows the detection unit to provide a stable and definite voltage level to enable the double power sources to process action to allow the electronic product to use the power from the internal battery to prevent the electronic product from being reset or locked while switching the power source and further when the voltage of the first power input terminal is discharged to the preset power source switching voltage level. Whereby, the stability of the electronic product can be elevated when the power source is switched, and the quality of the electronic product and of a user's satisfaction can be further be elevated. Furthermore, the double power sources switching circuit according to the present invention can effectively prevent the electronic product from being reset or locked in the process of poser source switching and is suitable for using on the electronic product with double power sources in which the power source switching is controlled by a hardware circuit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A double power sources switching circuit, positioned between a computer system and a peripheral device, comprising:
   a power output terminal, used for outputting power to said electronic product;
   a first power input terminal, used for inputting power to said power output terminal;
   a second power input terminal, used for inputting power to said power output terminal;
   a detection unit, used for detecting whether a voltage of said first power input terminal is lower than a preset switching value to allow a transition to be output; and
   a power source switching circuit, switching said second power input terminal to be electrically connected to said power output terminal to transmit power to said electronic product depending on an output of said detection unit;
   wherein, if a voltage of said first power input terminal is lower than said preset switching value of said detection unit in a continuous discharge state after said computer system is in a sleep or power-down mode, said power source switching circuit then switches said second power input terminal to provide electricity to said electronic product.

2. The double power sources switching circuit according to claim 1, wherein said preset value is a stable working voltage value of said electronic product.

3. The double power sources switching circuit according to claim 1, wherein said detection unit outputs a low potential if a voltage value of said first power input terminal is higher than or equal to said preset switching value and said detection unit outputs a high potential if said voltage value of said first power input terminal is lower than said preset switching value.

4. The double power sources switching circuit according to claim 1, wherein said first power input terminal is a USB port of said computer system.

5. The double power sources switching circuit according to claim 1, wherein said second input terminal is electrically connected to a battery.

6. The double power sources switching circuit according to claim 2, wherein said detection unit outputs a low potential if a voltage value of said first power input terminal is higher than or equal to said preset switching value and said detection unit outputs a high potential if said voltage value of said first power input terminal is lower than said preset switching value.

7. A double power source switching circuit, positioned between a computer system and a peripheral device, comprising:

a first power input terminal, provided for connecting to said computer system and used for inputting power to said power output terminal;

a second power input terminal, built in said electronic product;

a detection unit, used for detecting whether a voltage of said first power input terminal is lower than a preset switching value to allow a transition to be output; and a power source switching circuit, switching said second power input terminal to apply power to said electronic product depending on an output of said detection unit;

wherein, if a voltage of said first power input terminal is lower than said preset switching value of said detection unit in a continuous discharge state after said computer system is in a sleep or power-down mode, said power source switching circuit then switches said second power input terminal to provide electricity to said electronic product.

8. The double power sources switching circuit according to claim 7, wherein said preset value is a stable working voltage value of said electronic product.

9. The double power sources switching circuit according to claim 7, wherein said detection unit outputs a low potential if a voltage value of said first power input terminal is higher than or equal to said preset switching value and said detection unit outputs a high potential if said voltage value of said first power input terminal is lower than said preset switching value.

10. The double power sources switching circuit according to claim 7, wherein said first power input terminal is a USB port of said computer system.

11. The double power sources switching circuit according to claim 7, wherein said second input terminal is electrically connected to a battery.

12. The double power sources switching circuit according to claim 8, wherein said detection unit outputs a low potential if a voltage value of said first power input terminal is higher than or equal to said preset switching value and said detection unit outputs a high potential if said voltage value of said first power input terminal is lower than said preset switching value.

* * * * *